United States Patent
Chowdhury et al.

(10) Patent No.: US 6,417,948 B1
(45) Date of Patent: Jul. 9, 2002

(54) VARIABLE DELAY DEVICE FOR AN OPTICAL COMPONENT SUCH AS A POLARIZATION MODE DISPERSION COMPENSATOR

(75) Inventors: Dipakbin Q. Chowdhury, Corning; Robert G. Lindquist, Elmira; Ashiqur Rahman, Corning, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/663,755

(22) Filed: Sep. 15, 2000

Related U.S. Application Data (60) Provisional application No. 60/173,046, filed on Dec. 24, 1999.

(51) Int. Cl.[7] ............................. H04B 10/00; G02B 6/00
(52) U.S. Cl. ....................................... 359/161; 385/11
(58) Field of Search .............................. 359/156, 161, 359/179; 385/11

(56) References Cited

U.S. PATENT DOCUMENTS

| | | | |
|---|---|---|---|
| 4,529,262 A | | 7/1985 | Ashkin et al. |
| 4,572,608 A | | 2/1986 | Mochizuki et al. |
| 5,587,827 A | | 12/1996 | Hakimi et al. |
| 5,596,448 A | * | 1/1997 | Onaka et al. ............... 359/341 |
| 5,867,616 A | * | 2/1999 | Antos et al. .................... 385/11 |
| 5,930,414 A | * | 7/1999 | Fishman et al. .............. 385/11 |
| 5,978,125 A | | 11/1999 | Yao |
| 6,266,457 B1 | * | 7/2001 | Jacob ........................... 385/11 |
| 2001/0024538 A1 | | 9/2001 | Khosravani et al. |

FOREIGN PATENT DOCUMENTS

| | | |
|---|---|---|
| EP | 0 805 372 A | 11/1997 |
| WO | WO 98/37396 | 8/1998 |

OTHER PUBLICATIONS

Noé, R., et al.; Polarization Mode Dispersion Compensation at 10, 20, and 40 Gb/s with Various Optical Equalizers; Journal of Lightwave Technology; vol. 17, No. 9; Sep. 1999.

\* cited by examiner

Primary Examiner—Leslie Pascal
Assistant Examiner—Dalzid Singh
(74) Attorney, Agent, or Firm—Philip G. Alden

(57) ABSTRACT

A variable delay device of the type used to correct for polarization mode dispersion in a signal transmitted over an optical communications system. In an exemplary embodiment, the variable delay device uses a plurality of polarization rotators and delay elements aligned in series and alternating with one another. The polarization rotators map the fast polarization mode component of the incoming optical signal to the slow axes of one or more delay elements, to achieve a desired pattern of relative incremental delays which total the initial differential delay being compensated. The delay elements may have uniform or non-uniform incremental delay values, and the polarization rotators may be selectively actuated to achieve the desired pattern of delay values corresponding to the intended total delay. Examples of suitable delay devices include waveguides having relatively high differential group delay characteristics associated with two orthogonal axes compared with conventional single-mode transmission fiber, and examples of suitable polarization rotators include twisted nematic liquid crystal (TNLC) or ferroelectric liquid crystal (FLC) cells which rotate the polarization mode components of the optical signal by 90° when actuated.

14 Claims, 2 Drawing Sheets

VARIABLE DELAY DEVICE FOR AN OPTICAL COMPONENT SUCH AS A POLARIZATION MODE DISPERSION COMPENSATOR

This application claims benefit of Ser. No. 60/173,046 filed Dec. 29, 1999.

BACKGROUND OF THE INVENTION

1. Field of the Invention

The present invention relates generally to dispersion compensation in optical fiber transmission systems, and particularly to a differential delay component for use in a polarization mode dispersion (PMD) compensator.

2. Technical Background

The polarization of transmitted light is an important factor affecting the signal quality and available bandwidth (or channel spacing) in single-mode (SM) optical fibers. While single-mode fibers are usually characterized as carrying or supporting only one mode, they actually carry two degenerate modes each having orthogonal polarization relative to one another. By degenerate, it is meant that a single-mode optical fiber having a circularly-symmetric core would not differentiate between the two polarization modes, which are functionally identical or indistinguishable for most purposes. Given a single-mode fiber core having perfect circular symmetry, the presence of two distinct polarization modes would have negligible impact on optical fiber communications. However, in practice these two modes may be subject to polarization mode dispersion (PMD), in which the two polarization modes encounter dissimilar physical conditions or optical properties within the fiber, and therefore travel at slightly different speeds relative to one another. The different transmission speeds cause the polarization modes to spread or separate, creating a delay or phase offset between the two modes which is analogous to chromatic and other types of dispersion. Polarization mode dispersion can significantly denigrate the integrity of certain high-performance optical communications systems, particularly time-division-multiplexed signals operating on the order of 2.5 Gbit/second or faster.

There are several recognized causes of polarization mode dispersion which can be grouped into two main classes: birefringence and mode coupling. The causes may also be intrinsic to the fiber, or extrinsically induced. For example, the core of conventional single-mode fiber is not perfectly symmetric about the longitudinal axis, and non-uniformities in the index of refraction may vary both radially and axially over distances. These non-uniformities may result from deviations in normal dopant concentrations, physical stresses induced when the fiber is drawn or wound on a spool, or external physical pressures (sometimes called "lateral loading") induced by operations such as coating and cabling the optical fiber. Mode coupling (or "energy transfer") may result from coupling sites within the glass itself, fiber-to-fiber contact, contact between a coated optical fiber and other objects, or the bends and twists introduced into the length of optical fiber as it is laid, routed, spliced, or connected.

Longer lengths of optical fiber and complex optical transmission networks can then be viewed as a multiplicity of concatenated birefringent segments, with the output optical field reflecting the sum of the individual birefringences of each segment times their respective lengths. The state of polarization at the output will also fluctuate with time due to environmental conditions and physical changes in the configuration of the optical fiber and network.

Over distances, variations in some of these effects may cancel one another out, so that the resultant polarization mode dispersion at a particular node or receiver is relatively small. Conversely, because these effects are non-uniform, the polarization mode dispersion at one point along a transmission pathway may differ markedly from that at another point, and may also shift significantly over time. A given signal may also encounter different polarization mode dispersion effects when traversing alternate routes, so that the resultant dispersion evident in a signal at one location may depend upon the sum of uncorrected dispersion-causing effects to which that signal was subjected over a longer or unique transmission pathway. Polarization mode dispersion may also be introduced or varied somewhat randomly by the addition or deletion of optically-functioning components in a transmission pathway, such as when operations like amplification, wavelength-division multiplexing, regeneration, or switching are performed.

One approach towards compensating for polarization mode dispersion is specialized single-mode fibers which have polarization mode attenuating or maintaining properties created by intentionally-asymmetric cores. In single-polarization fiber, one polarization mode is transmitted normally, whereas the orthogonal polarization mode is subject to three or four orders of magnitude greater attenuation, effectively stripping that mode and leaving the first for signal transmission. In polarization-maintaining fiber, input light is split into two orthogonal modes along a core having an induced stress or asymmetry which defines an maintains different refractive indices (but similar attenuation values) for each polarization. The two polarization modes may travel at different speeds due to the relative refractive indices, but the light energy does not shift between polarization modes. Polarized light may be aligned with and transmitted along one axis of the polarization-maintaining fiber, in which case a single polarization mode is detected at the receiver. Alternately, both polarization modes may be transmitted, but only one filtered at the detector and used for communication signal transmission.

The use of single-polarization and polarization-maintaining fibers introduces certain limitations and drawbacks into the optical transmission system, such as the need to fabricate a more complex optical fiber geometry, or the need for more specialized transmitter and receiver components capable of aligning or detecting light signals at preferred polarization orientations. The polarization orientations must also be preserved or modified uniformly at various junctions along the optical pathway, such as splices or connections, polarization-dependent optical components, and so forth.

Another approach to the issue of polarization mode dispersion is a class of devices referred to as polarization mode dispersion compensators (or "PMD compensators"). These devices may be inserted into an optical pathway to detect and correct polarization mode dispersion at a given location (such as immediately before an amplifier, router, or receiver module), and may be periodically adjusted to increase or decrease the level of correction. The device may be adjusted depending upon the degree to which a relatively-constant polarization mode dispersion drifts over time, or may monitor and correct for near instantaneous shifts in polarization mode dispersion.

Though various designs and configurations for polarization mode dispersion compensators have been proposed, conceptually they may generally be regarded as having several common characteristics or operations. First, the two polarization modes must be split or differentiated from one another so that the relative time or phase differential (or "differential group delay") between the two modes can be accurately measured. A polarization transformer may also be used in this step to align each polarization mode with a fixed reference or axis. Second, a delay must be introduced into the pathway of the faster or leading polarization mode to counterbalance the measured differential. This variable differential time delay line may have fast and slow axes aligned with the polarization axes induced by the polarization transformer, and the delay line generally imposes a higher degree of delay along at least one axis compared with standard transmission fiber. Third, the polarization modes will be recombined for further transmission or signal processing (if the actual signal was split and measured, as opposed to tapping off a portion of the signal to be measured independently). Finally, some type of forward or backward feedback loop is established to control and periodically adjust the delay.

The process of measuring the differential between the two polarization modes and feeding that information back or forward to the component which responsively introduces the corrective delay into the system can be relatively complex. For example, various statistical methods and predictive modeling schemes have been proposed to accommodate certain system configurations or work effectively with different PMD compensator designs.

Various designs for generating the corrective delay have also been proposed. For example, one approach is to provide a plurality of slightly-differing spans of optical fiber connected via optical switches to the path of the faster polarization mode component of the signal. Each fiber span introduces a predetermined delay based upon its corresponding path length or a physical property of the optical fiber over that span. Given a measured differential, the PMD compensator would switch the faster polarization mode component of the split signal through one or more of these delay fiber spans, so that the total accumulated corrective delay equaled the measured differential (when considering the slower polarization mode component simultaneously traversing a fixed reference span). For a simplified example using delay spans having lengths which provide an increasing series of 0.5 picosecond (ps) delays relative to a fixed reference span, a measured 1.5 ps differential could be corrected by optically routing the faster polarization mode component sequentially through a 1.0 ps delay and a 0.5 ps delay using optical switches (while the slower polarization mode component traverses the fixed reference span) before recombining the two polarization mode components of the signal.

While the operation of such a differential delay component is conceptually simple, it will be readily appreciated that the design requires a plurality of parallel delay spans and optical switches, therefore increasing its complexity for manufacturing, assembly, and control systems. The individual components such as the optical switches might introduce unique variations into the system, therefore requiring tuning or adjustment prior to operation, as well as correcting for thermal or other instabilities which would affect the temporal delay as conditions change or the device ages. In addition, the range of total differentials to be accommodated and the number of discrete corrective delays or combinations to be introduced in some applications may require greater numbers of components and significantly increase the complexity of the device. The optical switches will likely be one limiting factor in the speed at which the PMD compensator can act upon instantaneous PMD variations, and possibly the lower time limit for the fastest corrective delay to be introduced at any one time.

SUMMARY OF THE INVENTION

Accordingly, the present invention is an in-line variable differential delay device which may be used for applications such as polarization mode dispersion compensation. Briefly described, in an exemplary embodiment the variable delay device utilizes a plurality of polarization rotators and delay elements aligned in series and alternating with one another along a single transmission pathway. The polarization rotators may be selectively actuated to map the fast polarization mode component of an incoming optical signal to the slow axis of the adjacent delay element, thus imposing an incremental delay on the fast polarization mode component of the optical signal. One or more of the polarization rotators may be actuated to implicate a desired pattern of delay elements (each having a corresponding incremental delay value) in order to achieve a total differential delay value for the device.

One aspect of the present invention is a variable delay component utilized to correct polarization mode dispersion in an optical signal having a fast polarization mode component, a slow polarization mode component, and an initial polarization mode differential, wherein the variable delay component comprises a plurality of delay elements each having a fast axis and a slow axis capable of transmitting a selected polarization mode, and a plurality of polarization selectors optically coupled to the delay elements (in series and alternating with one another) such that the optical signal traverses each of the plurality of polarization selectors and each of the plurality of delay elements as the optical signal traverses the variable delay component. A first polarization selector is actuated to translate the fast polarization mode component of the optical signal to the slow axis of one or more subsequent delay elements so as to impose an incremental delay on the fast polarization mode component of the optical signal. The sum of the incremental delays imposed by the plurality of delay elements on the fast polarization mode component of the optical signal generally corrects for the initial polarization mode differential.

In another aspect, the invention comprises a delay component including a delay element having a fast axis and a slow axis each capable of transmitting a selected polarization mode, and a polarization rotator optically coupled in series with the delay element, the polarization rotator being selectively actuated to rotate the fast polarization mode component of the optical signal to the slow axis of the delay element so as to impose an incremental delay on the fast polarization mode component of the optical signal, or the polarization rotator being selectively actuated to not rotate the fast polarization mode component of the optical signal to the slow axis of the delay element so as not to impose an incremental delay on the fast polarization mode component of the optical signal, such that the incremental delay imposed by the delay element on the fast polarization mode component of the optical signal generally corrects for at least a portion of the initial polarization mode differential.

In a further aspect, the present invention constitutes a method for compensating for polarization mode dispersion in a optical signal having a fast polarization mode component, a slow polarization mode component, and an initial polarization mode differential therebetween comprising steps of providing a plurality of delay elements each having a fast axis and a slow axis capable of transmitting a selected polarization mode, providing a plurality of polarization selectors disposed in series and alternating with the delay elements, and selectively actuating one or more of the polarization selectors in a predetermined pattern to translate the fast polarization mode component of the optical signal to the slow axis of one or more of the plurality of delay elements so as to impose one or more of the incremental delays on the fast polarization mode component of the optical signal, such that the sum of the one or more incremental delays imposed by the plurality of delay elements on the fast polarization mode component of the optical signal generally corrects for the initial polarization mode differential.

Another aspect of the present invention is characterized in a polarization mode dispersion compensator utilized to correct polarization mode dispersion in an optical signal having a fast polarization mode component, a slow polarization mode component, and an initial polarization mode differential therebetween, the polarization mode compensator including a device for discriminating between the fast polarization mode component and the slow polarization mode and for measuring the initial polarization mode differential, a variable delay device for imposing a selected delay on the fast polarization mode component of the optical signal, and a control device for adjusting the variable delay device in response to the initial polarization mode differential measured, wherein the improvement is a variable delay device in which a plurality of delay elements each have a fast axis and a slow axis and an incremental delay, and a plurality of polarization rotators disposed in series alternating with the plurality of delay elements, such that one or more of the polarization rotators may be actuated in a predetermined pattern to selectively rotate the fast polarization mode component of the optical signal to the slow axis of one or more of the plurality of delay elements so as to impose one or more of the incremental delays on the fast polarization mode component of the optical signal, such that the sum of the one or more incremental delays imposed by the plurality of delay elements on the fast polarization mode component of the optical signal generally corrects for the initial polarization mode differential.

Additional aspects, features, and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE PREFERRED EMBODIMENTS

Reference will now be made in detail to the present preferred embodiments of the invention, examples of which are illustrated in the accompanying drawing Figures. The exemplary embodiments of the variable differential delay device of the present invention are shown in FIGS. 1–10, and the variable differential delay device of the present invention is designated generally throughout by reference numeral 10. The variable delay device 10 is shown and discussed with representative embodiments directed to its use in conjunction with other components of a polarization mode dispersion (PMD) compensator for correcting undesirable polarization mode dispersion occurring in an optical fiber transmission network or system. The function, structure, and operation of components in a PMD compensator module are well known and understood by those of ordinary and requisite skill in the art, although further detailed description of the function, structure, operation, and factors considered when designing or implementing a PMD compensator module for use in an optical communications system may be obtained by reference to U.S. Pat. Nos. 5,930,414; 5,859,939; and 5,822,100, as well as other references submitted herewith or cited in the file history associated herewith. It may also be appreciated that the variable delay device 10 may be considered suitable or germane to other applications than PMD compensation, either in embodiments as described in detail herein or with adaptations or modifications by those reasonably skilled in the art, and the use of the variable delay device 10 of the present invention in PMD compensation is intended merely as an exemplary application to assist in ensuring a complete understanding of the function, structure, and operation of the variable delay device 10.

Figure 1:
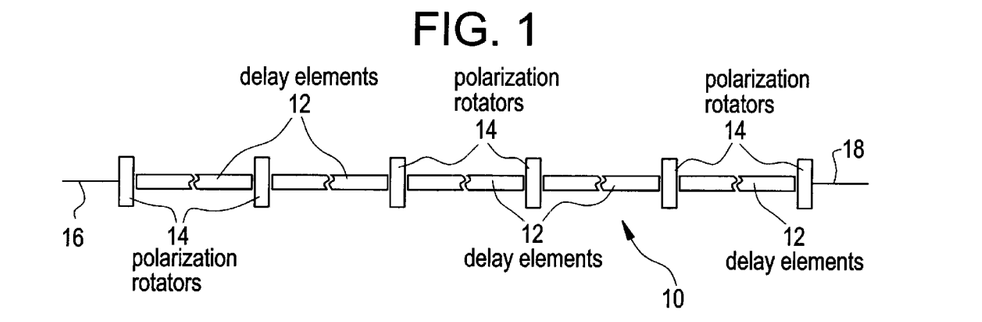
FIG. 1 is a schematic diagram of one embodiment of the variable delay device of the present invention showing a plurality of polarization rotators and delay elements disposed in-line in a series alternating with one another.

As embodied herein for use in PMD compensation, and referring particularly to FIG. 1, the variable delay device 10 includes a plurality of delay elements 12, and a plurality of polarization rotators or selectors 14. The delay elements 12 and the polarization rotators 14 are arranged in a generally linear series or sequence, with the delay elements 12 and the polarization rotators 14 generally alternating with one another along the series or sequence. The series of alternating delay elements 12 and polarization rotators 14 define an input end 16 and an output end 18 for directional reference, with delay elements 12 or polarization rotators 14 disposed more proximate to the input end 16 being considered more "upstream" and those more proximate to the output end 18 being considered more "downstream" relative to adjacent delay elements 12 or polarization rotators 14. Each individual delay element 12 and polarization rotator 14 may similarly be considered as having an associated input end 16 and output end 18 corresponding to the directions of the input end 16 and output end 18 of the variable delay device 10.

A light signal traversing through the variable delay device 10 from the input end 16 to the output end 18 will pass sequentially through each one of the plurality of delay elements 12 and plurality of polarization rotators 14, and will pass through each delay element 12 and polarization rotator 14 only once. If a light signal is routed so it traverses through the variable delay device 10 more than one time, that light signal will pass sequentially through each one of the delay elements 12 and polarization rotators 14 the same number of times that the light signal traverses the variable delay device 10.

The input end 16 or the output end 18 of the variable delay device 10 may be optically coupled to other components within a PMD compensator, to other optical components, or to an optical transmission system. The optical coupling at the input end 16 or the output end 18 of the variable delay device 10 may be accomplished using optical waveguides (including conventional optical fibers, planar waveguides, photonic crystals or photonic crystal fibers, micro-optic or free-space optic devices, or other suitable alternatives), or one or both of the input end 16 or the output end 18 of the variable delay device 10 may be incorporated directly with or into other components or optical elements of a PMD compensator (such as a polarization transformer) or other optically-functional device. For purposes of this exemplary embodiment, the input end 16 and the output end 18 of the variable delay device 10 may each be considered to be a short length of standard single-mode optical fiber in which the orthogonal polarization mode components of the input signal have a predetermined orientation relative to fixed reference axes at the input end of the variable delay device 10, or conversely a short length of polarization-maintaining optical fiber similarly defining predetermined orientations for the orthogonal polarization mode components.

Figures 2, 3, 4, 5:
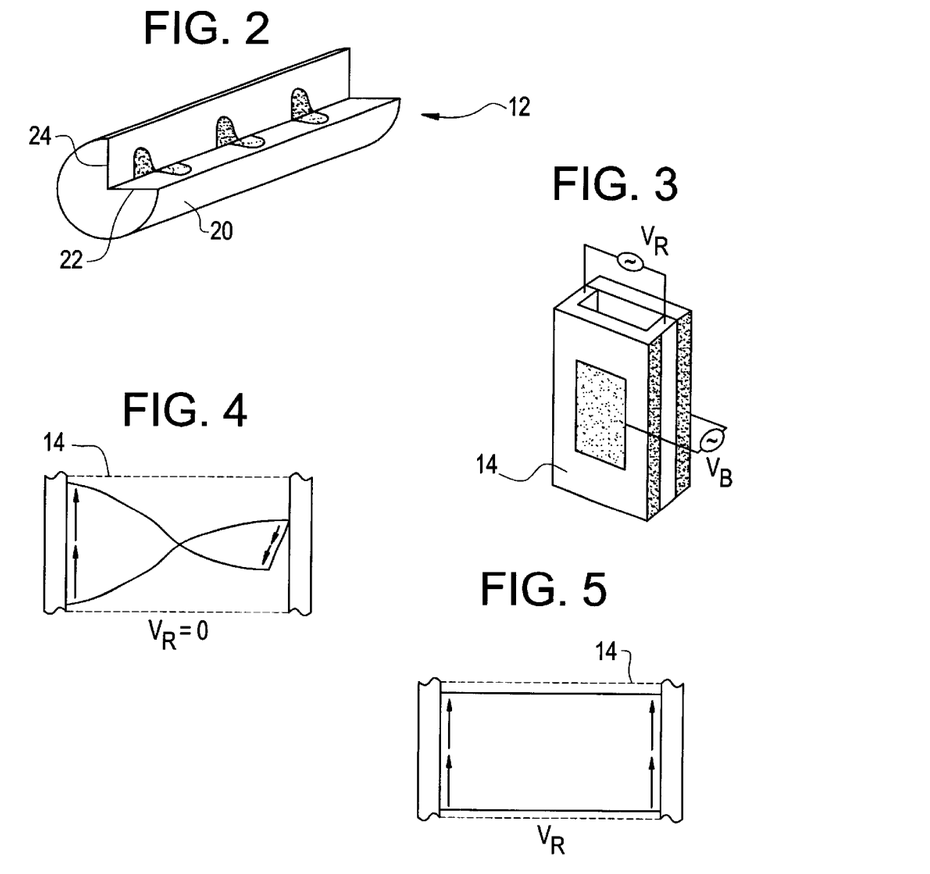
FIG. 2 is a partially broken-away perspective diagram of a portion of a waveguide embodiment of the delay element of FIG. 1 for use in the present invention, with waveform pulses superimposed on the fast and slow axes thereof.
FIG. 3 is a perspective diagram of a liquid crystal polarization transformer of a type which may be utilized in conjunction with the variable delay device of the present invention.
FIG. 4 is a diagram showing the translational mapping of a polarization mode component to an orthogonal axis by a polarization rotator for use in the present invention, with no control voltage being applied to the polarization rotator.
FIG. 5 is a diagram showing the polarization mode component passing a polarization rotator with no translational rotation of the polarization mode component, with a control voltage being applied to the polarization rotator

Referring particularly to FIG. 2, one embodiment of the delay element 12 is shown comprising a short span or segment of polarization-maintaining optical fiber 20 which may be represented as having a fast axis 22 and a slow axis 24 oriented generally perpendicular to one another induced by differing refractive indices in the orientations of those axes 22, 24. Superimposed on the optical fiber 20 are waveform diagrams depicting signal pulses representing the two orthogonal polarization mode components, one aligned with the fast axis 22 and one aligned with the slow axis 24 of the optical fiber 20. At the input end 16 of the segment of optical fiber 20, the polarization mode dispersion of the signal is shown by the pulse associated with the slow axis 24 being spatially separated from and ahead of the pulse associated with the fast axis 22 by an initial delay differential. As the signal pulses traverse the delay element 12, the pulse associated with the fast axis 22 travels at a first predetermined speed, and the pulse associated with the slow axis 24 travels at a significantly slower second speed compared with the first speed of the pulse associated with the fast axis 22. At the output end 18 of the segment of optical fiber 20, the delay element 12 has generally decreased or eliminated all or a portion of the initial delay differential representing the polarization mode dispersion between the two polarization mode components of the signal, as shown by the pulse associated with the slow axis 24 being spatially less separated from and closer to the pulse associated with the fast axis 22 when compared with the spatial separation at the input end 16 of the optical fiber 20.

The first and second speeds of the two polarization mode components associated with the fast axis 22 and slow axis 24 depend primarily upon the relative indices of refraction of the optical fiber 20 along those axes 22, 24. The different light transmission speeds may each be generally constant along the length of the delay element 12, or may be caused to vary linearly or non-linearly depending upon the selected optical properties of the delay element 12. In the case of an optical fiber 20 in which the speeds of the polarization mode components associated with the fast axis 22 and slow axis 24 are constant, the incremental delay induced by the delay element 12 will be generally linearly proportional to the delay constant (expressed in time per unit length, such as picoseconds-per-meter or picoseconds-per-kilometer) and the length of the signal path of the optical fiber 20 in the delay element 12. The range of delay constants which can be achieved is relatively large, and will dependent upon the particular operating parameters, system requirements, and choice of materials or components utilized in a given application of the variable delay device 10. In the case of an optical fiber 20 in which the speeds of the polarization mode components associated with the fast axis 22 and slow axis 24 are vary linearly or non-linearly through the optical fiber 20, the calculation of the induced delay will be correspondingly more involved and depend upon more complex relationships or formulas.

One or more of the plurality of delay elements may be engaged or actuated as described further herein to generate a pattern of incremental delays, the sum of which corresponds to or equates with the initial differential delay between the two polarization mode components which is being corrected or counterbalanced. It may be appreciated that a variable delay device 10 of the present invention may be fabricated using a plurality of delay elements 12 each having substantially the same delay constant and length, so that each delay element 12 induces a relatively uniform incremental delay adding to a total induced delay which is substantially equal to and therefore negates the initial polarization mode dispersion differential being corrected. Conversely, the plurality of delay elements 12 may having substantially the same delay constant but varying lengths, so that one or more of the delay elements 12 impose unique or distinct induced delays, with various combinations of those delay values adding to the measured or target value for the differential delay being compensated. Alternately, the plurality of delay elements 12 may having different or varying delay constants so similarly induce unique or distinct incremental delays, with various combinations of those delay values adding to the differential delay to be corrected. Moreover, various combinations of these configurations may be incorporated into the variable delay device 10 to accommodate the particular range of PMD values expected to be encountered and corrected in a given application, as well as providing a sufficient number of discrete or incremental values or gradations to achieve the desired degree of precision or accuracy.

In the representative embodiment of the variable delay device 10 described herein with reference to polarization mode dispersion compensation, the delay elements 12 have been described as waveguides having a fast axis 22 and a slow axis 24 corresponding to the orthogonal polarization mode components of the optical signal being transmitted through an optical communications network. A more general description of the delay elements 12 is that each has a fast optical characteristic and a slow optical characteristic capable of transmitting selected optical modes and imparting a differential delay to one of the modes relative to the other, or conversely accelerating one more relative to the other. In the case of the PMD compensation application, the fast and slow optical characteristics are differing indices of refraction (or other optical properties differentially affecting the propagation speed of light within the delay element 12) with which the polarization mode components of the signal may be preferentially aligned. The orientation of these fast and slow optical characteristics (or fast and slow axes 22, 24) of the delay elements 12 will generally be maintained uniformly or reproducibly throughout the variable delay device 10, or the variable delay device 10 will incorporate adjunct components such as polarization transformers for selectively and accurately aligning or translating the orientation of the signal's mode components to match the orientation of these fast and slow optical characteristics (or fast and slow axes 22, 24), at least to the extent that the operation of the variable delay device 10 is polarization dependent (or otherwise relies upon optical characteristics having an assigned spatial orientation relative to the optical signal or its mode components).

It may be appreciated that in the case of an embodiment of the variable delay device 10 for PMD compensation as described herein, one or more polarization transformers (or rotators) of a suitable type capable of selectively or responsively translating or rotating the orientation of the signal's polarization mode components to a desired orientation aligned with the axes 22, 24 of the delay elements 12 may optionally be utilized for polarization transformation at one or more positions upstream of or within the variable delay device 10. For example, a liquid crystal (LC) polarization rotator of the type conventionally used for a λ/2 or λ/4 birefringent wave plate may be. adapted by applying a variable birefringence voltage $V_B$ and rotation voltage $V_R$ to rotate the liquid crystals in a plane perpendicular to the plane of propagation. The speed of rotation is dictated by the molecular reorientation of the liquid crystal, but may be in the range of a few milliseconds (as opposed to rotation speeds for mechanical rotation devices which are typically one or more orders of magnitude slower).

Referring again to FIG. 1, the variable delay device 10 includes polarization rotators 14 which separate or alternate with the adjacent delay elements 12, including additional polarization rotators 14 at the input end 16 and/or the output end 18 of the variable delay device 10 (depending upon the particular embodiment employed). In one embodiment, the polarization rotators 14 are twisted nematic liquid crystal (TNLC) cells which rotate or translate the polarization mode components orthogonally (i.e., 90°) with a reasonably high degree of precision when no control voltage is applied, but which pass the polarization mode components without translation or rotation when a specified control voltage is applied. As such, when no voltage is applied to the polarization rotators, the fast polarization mode component of the incoming signal will be mapped to and optically coupled with the slow axis 24 of the downstream delay element 12, and conversely the slow polarization mode component of the incoming signal will be mapped to and optically coupled with the fast axis 22 of that downstream delay element 12. The optical signal will continue to propagate through one or more downstream delay elements (with the fast polarization mode component propagating along the slow axes 24 and the slow polarization mode propagating along the fast axes 22 of downstream delay elements 12) until a subsequent polarization rotator 14 to which no control signal is applied translates or rotates the polarization modes back to their original orientation, which are then optically coupled to further downstream delay elements 12 or to the output 18 of the variable delay device 10.

The TNLC cells operating as the polarization rotators 14 have a response time on the order of several milliseconds (ms) or less, the response time of the variable delay device 10 will be on the same order. Alternately, if faster response time is desired for a particular application, one embodiment of the variable delay device 10 employs ferroelectric liquid crystal (FLC) cells as the polarization rotators 14. The FLC cells operating as the polarization rotators 14 have a response time on the order of tens of microseconds ($\mu$s) or less, which permits tracking and correction of PMD fluctuations much faster than most conventional polarized interferometric delay lines which utilize micro-electric mechanical system (MEMS) elements such as pivoting, rotating, or sliding mirrors or prisms.

It may be appreciated that in one simplistic embodiment of the variable delay device 10, a single polarization rotator 14 and delay element 12 could be utilized to selectively introduce an incremental delay which has a single fixed value when the polarization rotator 14 is "actuated," or conversely introduce no delay when the polarization rotator 14 is not "actuated." In this sense, the term "actuated" is employed to distinguish the state of the polarization rotator 14 which translates the fast polarization mode components to the slow axis 24 of the delay element 12, even though such actuation may be achieved by interrupting or not applying (as opposed to applying) a control voltage. It will be further appreciated that the induced incremental delay is a relative delay, in the sense that there is a delay value associated with the difference in propagation speeds between the fast axis 22 and the slow axis 24 of the delay element 12, and that one of the two axes 22, 24 will therefore generally be regarded as a zero delay. This difference in propagation speeds may be treated as a delay of the fast polarization mode component, or an acceleration of the slow polarization mode component. In an alternative to the most simplistic embodiment described above, the single delay element 12 may impose two different incremental delays, one associated with each of the two axes 22, 24 of the delay element 12. In such a configuration, the variable delay device 10 would not impose a zero delay along either axis 22, 24.

It will further be readily apparent that embodiments of the variable delay device 10 to accommodate a wide range of total differentials to be compensated (and number of discrete gradations or combinations to be introduced to achieve the desired degree of precision) may be fabricated using a plurality or polarization rotators 14 and delay elements 12 while maintaining the single in-line configuration of the variable delay device 10. In such configurations, the delay elements 12 may be selected or designed to have uniform or geometrically-staggered incremental delay values which may be summed linearly. For example, one approach would be delay elements 12 each providing a 0.5 ps delay, which may then provide 0.5 ps, 1.0 ps, 1.5 ps, 2.0 ps, 2.5 ps, ... total delays. Another example would be staggered delay elements 12 providing an increasing (or decreasing) series of delay values, such as 0.5 ps, 1.0 ps, 2.0 ps, 4.0 ps, ... to permit 0.5 ps increments over a wider range of values. Non-uniform or staggered delay values may be utilized to achieve more complex total delay values and the requisite precision. Some applications may require significantly greater numbers of delay elements 12 and polarization rotators 14. To increase the range of total differentials being compensated or achieve the required precision for some applications, it may be desirable to configure more than one variable delay device 10 in parallel with one another, with the optical signal being routed to the appropriate variable delay device 10 using a conventional optical switch, or to permit the optical signal to be routed so as to traverse through the variable delay device 10 two or more times before being directed to an output transmission pathway or another optically-functioning component.

When a plurality of delay elements 12 are utilized in a predetermined pattern to achieve a desired total delay value, only some of which have the fast polarization mode component of the optical signal mapped to the slow axis, the calculation of the total or sum delay induced by the variable delay device 10 must also account for any delays imposed on one or both polarization mode components as they propagate through the remaining delay elements 12 with the fast polarization mode component aligned with fast axes 22 (and slow polarization mode component aligned with the slow axes 24). As such, it may be necessary to include delay elements 12 which (alone or together) impose a higher induced delay than the initial differential to be compensated (or which can be accumulated to a higher value), to account for other upstream or downstream delays imposed by the variable delay device 10 itself.

A more general description of the polarization rotators 14 is that each is a selector which may be selectively or responsively actuated to translate or map an intended mode component of the optical signal so as to be associated with a desired optical characteristic of the delay element. In the case of the PMD compensation application, the selector is a polarization rotator 14 which rotates the intended mode (a fast polarization mode) onto an target optical characteristic (the slow axis 24) of the delay element 12 so as to impose an incremental delay on that mode component of the optical signal.

Figure 6:
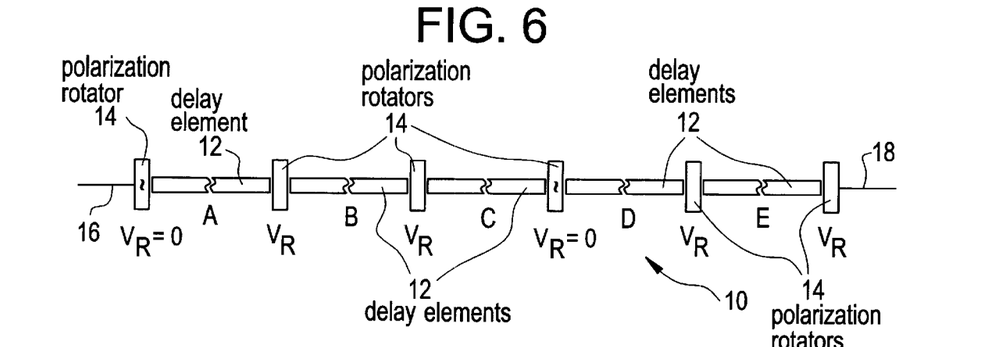
FIG. 6 is a schematic diagram showing one configuration of the variable delay device of the present invention in which the first and fourth polarization rotators are actuated to translate the polarization mode component to an orthogonal axis.
Figure 7:
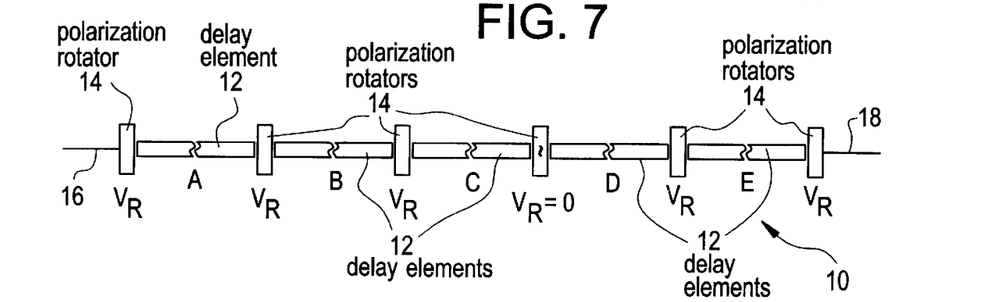
FIG. 7 is a schematic diagram showing an alternate configuration of the variable delay device of the present invention in which the fourth polarization rotator is actuated to translate the polarization mode component to an orthogonal axis.

Referring particularly to FIGS. 6 and 7, two embodiments of the variable delay device 10 are shown depicting two different patterns of actuated polarization rotators 14 and the implicated delay elements 12. In FIG. 6, the optical signal passes through a first polarization rotator 14 directly adjacent the input end 16 of the variable delay device 10. This first polarization rotator 14 is actuated (or has a null control voltage applied), and the polarization rotator 14 translates the orientation of the fast and slow polarization mode components onto the slow and fast axes 22, 24 of the subsequent downstream delay elements 12 (designated A, B, and C) and are generally unaffected through the downstream polarization rotators 14 (to which control voltages are applied and no mode-to-new-axis translation occurs), until the fourth polarization rotator 14 which is actuated translates the polarization mode components back to their original or initial orientation, such that the optical signal is subsequently unaffected by traversing additional downstream delay elements 12 (designated D and E).

In FIG. 7, the optical signal is introduced to the variable delay device 10 from the input end 16, but the initial polarization rotators 14 do not translate the orientation of the polarization modes. One of the downstream polarization rotators 14 is actuated, resulting in the polarization mode components being mapped to the orthogonal axes 22, 24. Depending on whether the fast polarization mode component of the optical signal is initially aligned with the fast axis 22 or slow axis 24 of the delay elements 12, the fast polarization mode component will or will not experience an incremental delay induced by each of the initial delay elements 12, but experience an opposite influence from the delay elements 12 downstream of the actuated polarization rotator 14. For example, if the first three polarization rotators 14 are not actuated and the polarization mode components are aligned with the corresponding axes 22, 24 of the delay elements 12, then the first three delay elements 12 (designated A, B, and C) will not induce an incremental delay, but after the fourth polarization rotator 14 translates the polarization mode components to the orthogonal axes 22, 24 of the downstream delay elements 12 (designated D and E), those downstream delay elements 12 (D and E) will induce an incremental delay.

It may be appreciated that different ones of the polarization rotators 14 may be actuated (or remain non-actuated) to create a pattern of adjacent delay elements 12 which respectively induce or do not induce incremental delays in the fast polarization mode component of the optical signal, and that the use of several delay elements 12 having uniform or non-uniform delay values may achieve a wide range and degrees of precision in the variable delay device 10.

Figures 8, 9, 10:
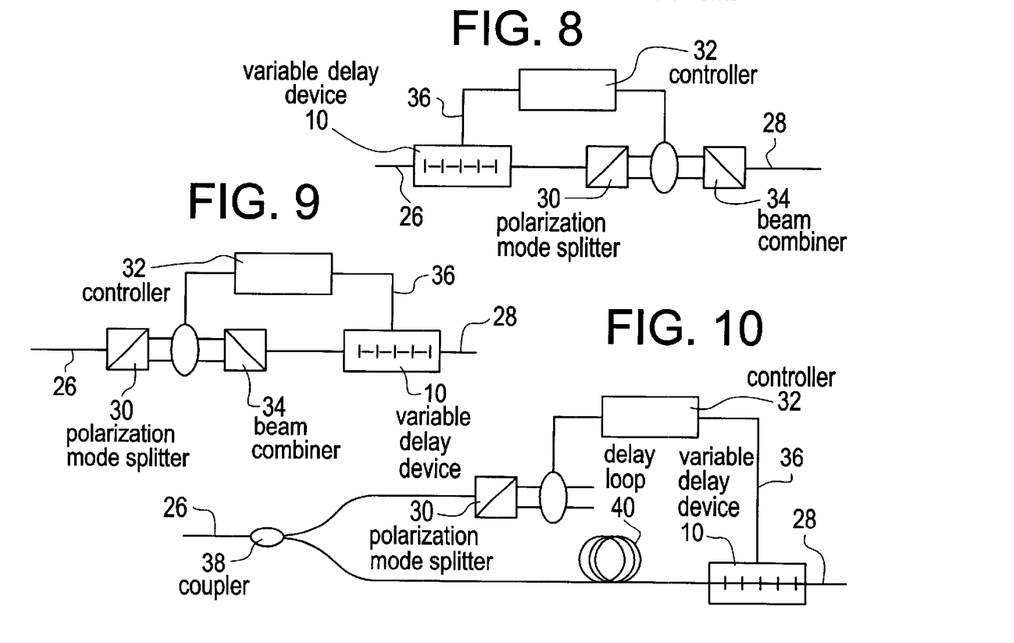
FIG. 8 is a schematic diagram of one configuration of a polarization mode dispersion compensator module employing the variable delay device of the present invention.
FIG. 9 is a schematic diagram of an alternate configuration of a polarization mode dispersion compensator module employing the variable delay device of the present invention.
FIG. 10 is a schematic diagram of a further alternate configuration of a polarization mode dispersion compensator module employing the variable delay device of the present invention.

Referring particularly to FIGS. 8–10, the variable delay device 10 of the present invention may be utilized for PMD in a variety of conceptual configurations as shown diagrammatically in those Figures. For example, FIGS. 8 and 9 represent schematic configurations for PMD compensators designed to correct for PMD which remains relative constant or drifts over time. In FIG. 8, an optical signal is conveyed via a transmission path 26 such as an optical fiber to the variable delay device 10 which imparts a predetermined induced delay to the fast polarization mode component of the signal, correcting the initial differential delay. The signal propagates to a polarization mode splitter 30 or polarization-dependent beam splitter which differentiates the fast and slow polarization mode components, and the delay differential is subsequently measured and a control signal created by a controller 32. The polarization mode components of the signal are recombined by a beam combiner 34 or other suitable device, and the control signal is passed through a feedback loop 36 to the variable delay device 10. Slight shifts in polarization mode dispersion are therefore detected, a compensating delay calculated, and a control signal fed back to the variable delay device 10. Periodic adjustments to the variable delay device 10 as the PMD value drifts allows the PMD to be compensated for a substantially zero PMD along the output transmission pathway 28.

Referring to FIG. 9, an alternative configuration is described in which the variable delay device 10 is downstream of the polarization mode splitter 30, controller 32, and beam combiner 34 so that the feedback is forwarded to the variable delay device 10.

In the configuration shown in FIG. 10, an optical signal is similarly conveyed via a transmission path 26 such as a single-mode optical fiber to a coupler 38 which divides a portion of the signal power to a polarization mode splitter 30 or polarization-dependent beam splitter which differentiates the fast and slow polarization mode components, and the delay differential is subsequently measured and a control signal created by a controller 32. The tapped portion of the signal which was differentiated and PMD measured may be discarded, whereas the balance of the optical signal is maintained in a delay loop 40 a time sufficient for the initial differential delay to be calculated, a control signal generated, and the polarization rotators 14 in the variable delay device 10 to be reconfigured to provide the compensating delay. In such a configuration, the transmission time of the system is retarded somewhat by the delay loop, however the PMD is compensated in the portion of the optical signal for which the PMD was actually measured.

Of course, it is understood that these are merely exemplary configurations of PMD compensator architectures intended only to convey the basic operating principles of different measurement and feedback options for PMD compensation, and practical implementations of the variable delay device 10 may be incorporated or practiced in a variety of compensation architectures having greater complexity and an array of adjunct components of different designs well know to those skilled in the art, including components hereafter developed to serve similar purposes.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

While the preferred embodiments of the above variable differential delay device 10 have been described in detail with reference to the attached drawing Figures, it is understood that various modifications, variations, and adaptations may be made in the variable delay device 10 by those skilled in the art without departing from the spirit and scope of the appended claims. Thus, it is intended that the present invention cover those modifications, variations, and adaptations provided they come within the scope of the appended claims and their equivalents.

What is claimed is:

1. A variable delay component utilized to correct polarization mode dispersion in an optical signal having a fast polarization mode component, a slow polarization mode component, and an initial polarization mode differential therebetween, the variable delay component comprising:

a plurality of optical fiber delay elements each having a fast axis and a slow axis capable of transmitting a selected polarization mode; and a plurality of polarization selectors optically coupled to the plurality of optical fiber delay elements, the plurality of optical fiber delay elements and the plurality of polarization selectors disposed in series and alternating with one another such that the optical signal traverses each of the plurality of polarization selectors and each of the plurality of optical fiber delay elements as the optical signal traverses the variable delay component, at least a first of the plurality of polarization selectors selectively actuated to translate the fast polarization mode component of the optical signal to the slow axis of at least a subsequent one of the plurality of optical fiber delay elements so as to impose an incremental delay on the fast polarization mode component of the optical signal, such that the sum of the incremental delays imposed by the plurality of optical fiber delay elements on the fast polarization mode component of the optical signal generally corrects for the initial polarization mode differential.

2. The variable delay component of claim 1 further comprising:

a second of the plurality of polarization selectors selectively actuated to translate the fast polarization mode component of the optical signal back to the fast axis of at least one subsequent optical fiber delay element of the plurality of optical fiber delay elements, such that the at least one subsequent optical fiber delay element does not impose an incremental delay on the fast polarization mode component of the optical signal.

3. The variable delay component of claim 1 wherein the plurality of polarization selectors are selectively configured in both the actuated state and the non-actuated state to produce a pattern of incremental delays among the plurality of optical fiber delay elements, such that the sum of the incremental delays generally corresponds with a delay value which compensates for the initial differential delay.

4. The variable delay component of claim 1 wherein the plurality of optical fiber delay elements are waveguide segments each having a length, a generally uniform delay constant, and a characteristic incremental delay which is the product of the delay constant and the length, the characteristic incremental delay varying among the plurality of optical fiber delay elements primarily due to a difference in the length of each of the plurality of optical fiber delay elements.

5. The variable delay component of claim 1 wherein the plurality of delay elements are waveguide segments each having a length, a delay constant, and a characteristic incremental delay which is the product of the delay constant and the length, the characteristic incremental delay varying among the plurality of delay elements primarily due to a difference in the delay constant of each of the plurality of delay elements.

6. The variable delay component of claim 1 wherein the plurality of optical fiber delay elements are polarization maintaining optical fibers.

7. The variable delay component of claim 1 wherein at least one of the plurality of polarization selectors is a polarization rotator.

8. The variable delay component of claim 7 wherein the polarization rotator is a twisted nematic liquid crystal cell.

9. The variable delay component of claim 7 wherein the polarization rotator is a ferroelectric liquid crystal cell.

10. A variable delay component utilized to correct polarization mode dispersion in an optical signal having a fast polarization mode component, a slow polarization mode component, and an initial polarization mode differential therebetween, the variable delay component comprising:

a plurality of optical fiber delay elements each having a fast axis and a slow axis capable of transmitting a selected polarization mode; and a plurality of polarization selectors optically coupled to the plurality of optical fiber delay elements, the plurality of delay optical fiber elements and the plurality of polarization selectors disposed in series with one another such that the optical signal traverses each of the plurality of polarization selectors and each of the plurality of optical fiber delay elements as the optical signal traverses the variable delay component, the fast polarization mode component of the optical signal being generally aligned with the slow axis of at least one of the plurality of optical fiber delay elements to impose an incremental delay on the fast polarization mode component of the optical signal, at least one of the plurality of polarization selectors being selectively actuated to translate the fast polarization mode component of the optical signal to the fast axis of subsequent ones of the plurality of optical fiber delay elements so as not to impose an incremental delay on the fast polarization mode component of the optical signal, such that the sum of the incremental delays imposed by the plurality of optical fiber delay elements on the fast polarization mode component of the optical signal generally corrects for the initial polarization mode differential.

11. A delay component utilized to correct polarization mode dispersion in an optical signal having a fast polarization mode component, a slow polarization mode component, and an initial polarization mode differential therebetween, the variable delay component comprising:

an optical fiber delay element having a fast axis and a slow axis each capable of transmitting a selected polarization mode; and a polarization rotator optically coupled to the optical fiber delay element, the delay element and the polarization rotator disposed in series with one another such that the optical signal traverses the polarization rotator and the optical fiber delay element, the polarization rotator selectively actuated to rotate the fast polarization mode component of the optical signal to the slow axis of the optical fiber delay element so as to impose an incremental delay on the fast polarization mode component of the optical signal, or the polarization rotator selectively actuated to not rotate the fast polarization mode component of the optical signal to the slow axis of the optical fiber delay element so as not to impose an incremental delay on the fast polarization mode component of the optical signal, such that the incremental delay imposed by the optical fiber delay element on the fast polarization mode component of the optical signal generally corrects for at least a portion of the initial polarization mode differential.

12. A method for compensating for polarization mode dispersion in a optical signal having a fast polarization mode component, a slow polarization mode component, and an initial polarization mode differential therebetween, the method comprising the steps of:

providing a plurality of optical fiber delay elements each having a fast axis and a slow axis capable of transmitting a selected polarization mode, each of the plurality of optical fiber delay elements having an incremental delay associated with the slow axis thereof;

providing a plurality of polarization selectors, the plurality of optical fiber delay elements and the plurality of polarization selectors being disposed in series and alternating with one another such that the optical signal traverses each of the plurality of polarization selectors and each of the plurality of optical fiber delay elements as the optical signal traverses the variable delay component; and selectively actuating one or more of the polarization selectors in a predetermined pattern to translate the fast polarization mode component of the optical signal to the slow axis of one or more of the plurality of optical fiber delay elements so as to impose one or more of the incremental delays on the fast polarization mode component of the optical signal, such that the sum of the one or more incremental delays imposed by the plurality of optical fiber delay elements on the fast polarization mode component of the optical signal generally corrects for the initial polarization mode differential.

13. In a polarization mode dispersion compensator utilized to correct polarization mode dispersion in an optical signal having a fast polarization mode component, a slow polarization mode component, and an initial polarization mode differential therebetween, the polarization mode compensator including a device for discriminating between the fast polarization mode component and the slow polarization mode and for measuring the initial polarization mode differential, a variable delay device for imposing a selected delay on the fast polarization mode component of the optical signal, and a control device for adjusting the variable delay device in response to the initial polarization mode differential measured, the improvement in the variable delay device comprising:

a plurality of optical fiber delay elements each having a fast axis and a slow axis and an incremental delay associated with the slow axis thereof; and a plurality of polarization rotators optically coupled to and disposed in series alternating with the plurality of optical fiber delay elements, such that one or more of the polarization rotators may be actuated in a predetermined pattern to selectively rotate the fast polarization mode component of the optical signal to the slow axis of one or more of the plurality of optical fiber delay elements so as to impose one or more of the incremental delays on the fast polarization mode component of the optical signal, such that the sum of the one or more incremental delays imposed by the plurality of optical fiber delay elements on the fast polarization mode component of the optical signal generally corrects for the initial polarization mode differential.

14. A variable delay component utilized to correct polarization mode dispersion in an optical signal having a first mode component, a second mode component, and an initial differential therebetween, the variable delay component comprising:

a plurality of optical fiber delay elements each having a fast optical characteristic and a slow optical characteristic capable of transmitting a selected optical mode; and a plurality of selectors optically coupled to the plurality of optical fiber delay elements, the plurality of optical fiber delay elements and the plurality of selectors disposed in series and alternating with one another such that the optical signal traverses each of the plurality of selectors and each of the plurality of optical fiber delay elements as the optical signal traverses the variable delay component, a first of the plurality of selectors being selectively actuated to translate the first mode component of the optical signal to be associated with the slow optical characteristic at least one of the plurality of optical fibers delay elements so as to impose an incremental delay on the first mode component of the optical signal, such that the sum of the incremental delays imposed by the plurality of optical fiber delay elements on the first mode component of the optical signal generally corrects for the initial differential.

* * * * *